even if capacity variations from linearity do arise as a result of departures from an exactly uniform lead screw thread pitch, capacitance settings will still be repeatable.

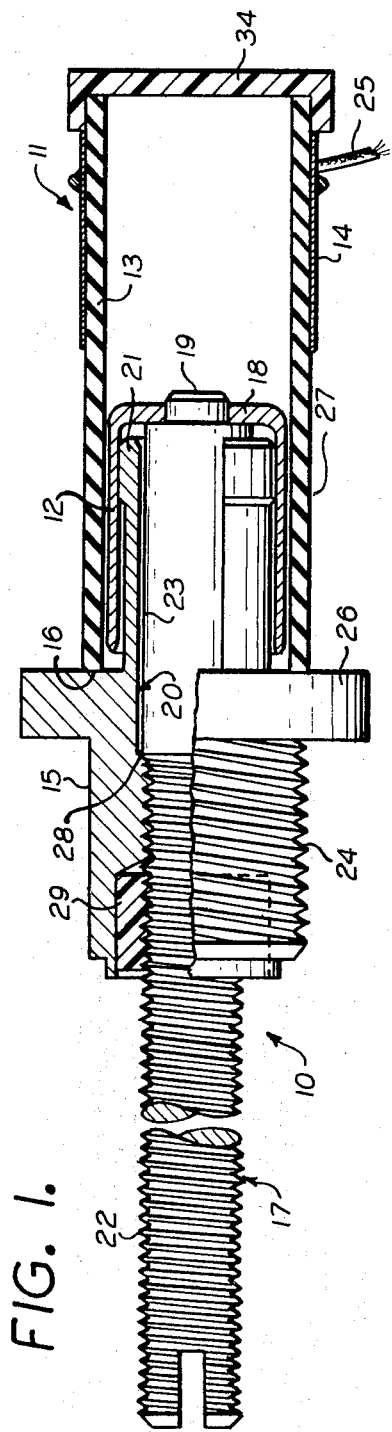
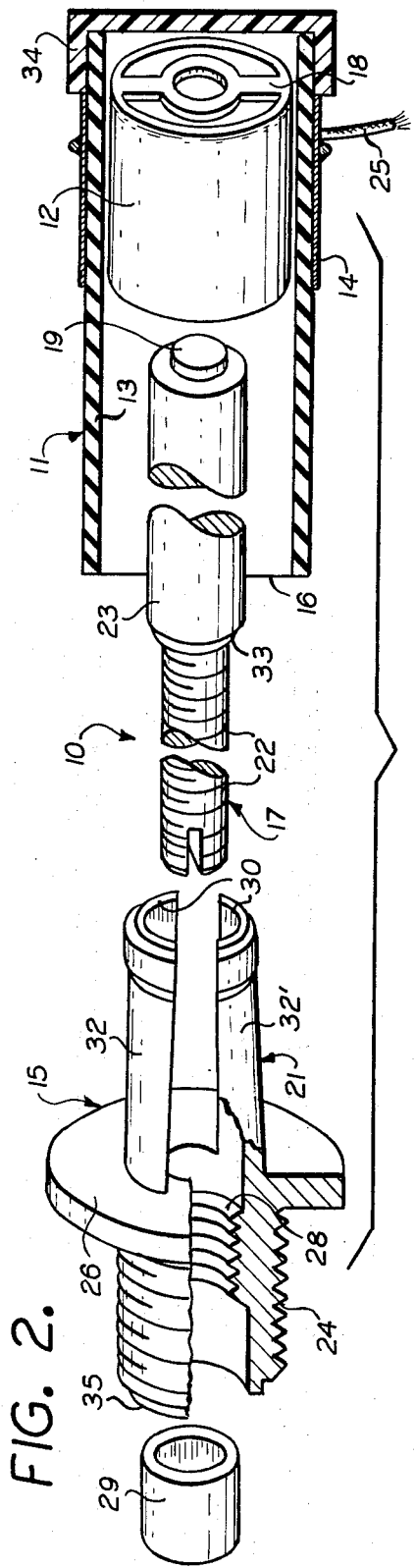
FIG. 1.
FIG. 2.

United States Patent Office 3,361,945
Patented Jan. 2, 1968

3,361,945
PISTON TRIMMER CAPACITOR
Martin Mittler, Parsippany, and Martin L. Blickstein, West Caldwell, N.J., assignors to Voltronics Corporation, Hanover, N.J.
Filed Apr. 6, 1966, Ser. No. 540,634
10 Claims. (Cl. 317—249)

ABSTRACT OF THE DISCLOSURE

This specification discloses a novel piston trimmer capacitor wherein the capacitor has a cylindrical electrode, a piston electrode, and a dielectric therebetween. The piston electrode is mounted on a lead screw which is in threaded engagement with a bushing attached to the cylinder. The bushing further has a collet bushing extending therefrom into the cylinder about the lead screw body. The lead screw has a threaded portion for engagement with the threaded portion of the bushing and a smooth portion which engages the piston and has a length about equal to the length which the piston can travel in the cylinder. The collet bushing contacts either the smooth portion of the lead screw, the inside surface of the piston (where the piston has a larger inside diameter than the outside diameter of the smooth portion of the lead screw), or both.

---

This invention relates in general to trimmer reactors such as capacitors and inductors, and more particularly to a piston trimmer capacitor wherein the effective capacitance can be adjustably varied by rotating a lead screw to axially position a capacitor plate defined by a piston member with respect to a fixed capacitor plate defined by a tubular member.

For simplicity in construction, the piston member and lead screw are arranged within the tubular member, preferably coaxially therewith, and the piston member is mounted directly to the lead screw for positioning thereby. The lead screw is disposed in threaded engagement with the bore of a support bushing inserted into one end of the tubular member, preferably with a self-retaining press fit. Thus, both the piston member and lead screw will rotate in unison describing a helical path as the lead screw is rotated to axially displace the piston member. By using a cylindrical metallic piston disposed coaxially within a cylindrical tubular member, the effective capacitance established thereby will be substantially a linear function of the axial position of the piston and the total angular displacement of both the lead screw and piston with respect to a reference position. With reasonable manufacturing precision, the linearity of capacitance variation will be negligibly affected by the fact that the piston achieves its axial translation by the combined rotation inherent with a helically threaded lead screw.

Since the support bushing which engages the lead screw thread is fixed in relation to the tubular member, there is a unique correspondence between the axial position of the piston and the total angle of rotation through which the lead screw is turned from a reference position of the piston. Consequently, even if capacity variations from linearity do arise as a result of departures from an exactly uniform lead screw thread pitch, capacitance settings will still be repeatable.

In piston trimmer capacitors of the prior art, one of the problems encountered was that of maintaining a good electrically conductive path between the movable piston capacitor plate and the terminal used for making external circuit connections thereto. Ordinarily, this terminal is constituted by a metallic support bushing and the only path conduction from such bushing to the movable piston is through the thread engagement of the lead screw with the bushing bore, said lead screw being metallic for conductive connection to the piston. Such threaded connections offer relatively poor and unreliable electrical conduction because they can be infiltrated with dirt and grease, and because they are made with a certain amount of clearance to permit a workable mating thread engagement.

While the invention does not discard the conductive path provided via the lead screw thread connection to the support bushing, it does provide a piston trimmer capacitor construction featuring an additional independent piston-to-bushing conduction path which is not subject to any significant conductivity losses or variations as the piston is shifted, and which results in a trimmer capacitor having a higher over-all Q factor. This additional conduction path afforded by the invention results from using a support bushing which has an electrically conductive collet bushing portion extending longitudinally into the tubular member and disposed for wiping contact engagement with an electrically conductive portion of the lead screw, preferably a smooth, enlarged diameter cylindrical shank portion thereof.

Fortunately, such conductivity problems are not too significant with respect to providing the terminal connection for the fixed capacitor plate defined by the tubular member. The tubular member can be expediently constructed by applying a layer of metal, such as a metallic foil, to the exterior surface of a tube made of an electrically insulating material. Such tube can constitute the principal dielectric of the capacitor, or can be used merely as a support for the metal layer which actually constitutes the fixed capacitor plate, with an air space being the principal dielectric in such case. With a fixed capacitor plate defined by a metallic layer on the outside of a tube, a terminal connection to such fixed plate can be achieved simply by soldering a wire around the tube and onto the metallic foil.

Preferably, the tube is made with an internal diameter approximately equal to the outside diameter of the piston, but with a sliding fit tolerance, so as to provide some lateral support for the piston thereby rendering the trimmer capacitor assembly less susceptible to capacitance variations under vibrations.

It is therefore, an object of the invention to provide a trimmer reactor of the type wherein the electrical reactance can be varied by axially positioning a piston element in relation to a tubular element.

Another object of the invention is to provide a trimmer reactor as aforesaid which is of the capacitive type. A further object of the invention is to provide a piston trimmer capacitor wherein a relatively high conductivity path is provided between the piston capacitor plate and the external connection terminal therefor.

A further object of the invention is to provide a piston trimmer capacitor as aforesaid having a high over-all Q factor and suitable for high frequency applications.

A further object of the invention is to provide a piston trimmer capacitor as aforesaid having a relatively precise linear capacitance variation.

A further object of the invention is to provide a piston trimmer capacitor as aforesaid which features a relatively precise means of capacitance adjustment.

Still another and further object of the invention is to provide a piston trimmer capacitor as aforesaid including means for retaining previously established capacitance settings against the influence of environmental disturbances such as vibration.

Other and further objects and advantages of the invention will become apparent from the following detailed description and accompanying drawings in which:

FIG. 1 is a longitudinal view, partly in section, of a piston trimmer capacitor according to a preferred embodiment of the invention.

FIG. 2 is an exploded perspective view of the trimmer capacitor of FIG. 1.

Referring now to FIGS. 1 and 2, in the piston trimmer capacitor 10 of the instant invention, the electrical capacitance thereof is established by a tubular member 11 which defines a fixed capacitor plate, and a piston member 12 which defines a movable capacitor plate. As used herein, the term "capacitor plate" designates an electrode which when arranged in an insulated spaced-apart cooperative relation to another electrode can serve to store electrical charge when connected with a source of electric potential, and hence such electrodes define an electrical capacitor irrespective of their particular shapes. Consequently, as understood in the art, capacitor plates are not restricted to planar surfaces of electrode materials, such as metals. For example, the particular capacitor plate shapes utilized in the capacitor 10 are actually cylindrical surfaces disposed one within the other.

In the capacitor 10, the piston member 12 is a cylindrical body of metallic material, preferably a tubular body closed at one end, and the tubular member 11 is constructed from a tube 13 of electrical insulating material and a metallic layer 14 disposed in contact with the exterior surface of the tube 13 for support thereby. This particular arrangement is expedient since the tube 13 can serve as the principal dielectric for the capacitor 10 and also as a support for the actual fixed capacitor plate which is constituted by the metallic layer 14.

The piston 12 is disposed for combined axial and rotary movement within the tubular member 11 whereby said piston can be adjustably axially positioned with respect to the tubular member 11, or more significantly with respect to the metallic layer 14 thereof, to vary or trim the capacitance established by the capacitor plate defined by said piston 12 and the capacitor plate constituted by the layer 14 which preferably is a layer 14 circumferentially surrounding a predetermined axial length portion of the tube 13.

A support bushing 15 inserted into one end 16 of the tube 13 serves to guide a lead screw member 17 to which the closed end 18 of the piston 12 is affixed at one end 19 thereof. The support bushing 15 is provided with a longitudinally disposed bore 20 and a longitudinally extending collet bushing 21 which preferably extends into the tube 13. The lead screw 17 has a threaded portion 22 disposed in threaded engagement with the bore 20, and an enlarged diameter cylindrical shank portion 23 disposed for wiping contact engagement with the collet bushing portion 21.

One of the problems experienced generally in the construction of variable capacitors employing movable plate elements is that of providing a low-loss electrically conductive path from the movable plate to a stationary terminal which, for practical purposes, is required in most circuit arrangements. In prior art piston trimmer capacitors, as well as in the case of the capacitor 10 of the instant invention, it is necessary to provide such a low-loss conductive path from the piston 12 to the support bushing 15, which is preferably made of metal so as to be capable of serving as a terminal for electrically connecting the piston 12 capacitor plate to an external circuit (not shown). The support bushing 15 is fixedly inserted into the tube 13 and has an externally threaded shank portion 24 extending longitudinally outward with respect to the tubular member 11 to accommodate the mounting of the capacitor 10 to a support means, such as a chassis, panel, circuit board, etc. (not shown). This threaded portion 24 can also serve for electrically connecting the bushing 15 to an external circuit (not shown) as well as for mounting purposes.

Accordingly, the invention provides two electrical conduction paths between the support bushing 15 and piston 12, one of these extending through the collet bushing 21 and shank portion 23 of the lead screw 17, by reason of their mutual wiping contact engagement, and the other extending through the threaded portion 22 of said lead screw by reason of its threaded engagement with the bore 20. The conduction path afforded by the collet bushing 21 and shank 23 contact is by far the better of the two, since threaded connections, particularly those wherein relative movement occurs, are notoriously lossy and unreliable conduction paths. Hence, the capacitor 10 construction of the invention retains whatever conductivity is afforded by the threaded engagement of the lead screw 17 with the bore 20 of bushing 15, but also provides an additional and better conductivity path in parallel therewith.

Fortunately, the type of terminal connection problems associated with the movable piston 12 do not arise in the case of the fixed capacitor plate established by the layer 14. The layer 14 can be expediently adapted for external circuit connection simply by wrapping a wire 25 in contact therewith and soldering such wire 25 to the layer 14 to assure a good electrical as well as mechanical connection. If desired, a metal band (not shown) having an eyelet or other terminal connection device can be substituted for the wire 25.

It should be noted that because the bushing 15 is conductively connected to the piston 12, the metallic layer 14 is not extended into contact with the flange 26 of said bushing 15, as such contact would short-circuit the capacitor 10. Therefore, a clearance zone 27 is provided on the tube 13 between the layer 14 and bushing flange 26.

While only one layer 14 has been illustrated for purposes of simplicity, one or more separate layers (not shown) similar to the layer 14 can be provided on the tube 13 so as to achieve a differential type of trimmer capacitor 10. With a second layer (not shown) axially spaced apart from the layer 14, the piston 12 could be positioned to vary the capacitance between it and such second layer and simultaneously to vary the capacitance between it and the layer 14 in the opposite direction.

For practical purposes, the axial travel of the piston 12 relative to the cylindrical sheath-like layer 14 is limited approximately to a distance which at one extremity will enable the piston 12 to be completely inserted into the axial zone defined by the layer 14 for maximum capacitance, and at the other extremity will permit the piston 12 to be withdrawn at least completely from said axial zone, and preferably to be retracted close to flange 26 of the bushing 15 for minimum capacitance. The cylindrical shank portion 23 of the lead screw 17 is preferably of a length which corresponds to the axial travel of the piston 12, so that the collet bushing 21 will always engage the smooth shank portion 23 rather than the threaded portion 22.

By providing the bushing 15 with an internal shoulder 28 circumferentially surrounding the lead screw 17 and having a diameter which is substantially equal to the diameter of the threaded portion 22 but less than the diameter of the shank portion 23, the axial travel of the piston 12 can be limited in the minimum capacitance direction. With such an arrangement, the threaded portion 22 can pass freely through the shoulder 28, but the enlarged diameter shank 23 will be engaged thereby to limit withdrawal of lead screw 17 and hence, the minimum capacitance setting of the capacitor 10.

The piston 12 is preferably a tubular body rather than a solid body so that it can be telescoped over the collet bushing 21 into the minimum capacitance position.

Another feature which is desirable in adjustable capacitors, and which is provided in the trimmer capacitor 10, is a frictional resisting means for maintaining capacitance settings. Although the problem of holding capacitance settings is more significant in rotary variable capacitors of the type commonly used for RF tuning purposes, and is not as severe with capacitors, such as the capacitor 10, wherein the movable plate element is positioned by a lead screw 17, nevertheless, it is advantageous to provide means for resisting the random or unintended movement of the piston 12 as may occur under vibration and shock environments.

Because the threaded engagement between the lead screw 17 and the bushing bore 20 provides a relatively high mechanical advantage between the axial movement of the lead screw 17 and piston 12 and the rotary movement thereof which results in such axial movement, the invention employs a tubular member 29 of resilient material such as a plastic-like nylon or Teflon inserted into the bore 20 of bushing 15 and disposed in frictional contact engagement with the thread 22 of lead screw 17 to provide a frictional resisting torque acting upon said lead screw 17 to aid in maintaining axial position settings of the piston 12.

In addition, the collet bushing 21 can be so constructed as to have a contact surface 30 of lesser free diameter than that of the enlarged shank 23 so that when said contact surface 30 is in wiping engagement with the shank 23, the collet segments 32 and 32' are somewhat spread apart radially and exert a frictional force, i.e. a resisting torque upon the shank 23. In addition to assuring a low resistance wiping contact with the shank 23, such a collet bushing 21 construction provides a self-holding feature for the adjustment of the piston 12.

To prevent jamming when the shank 23 is passed in through the end of the collet bushing 21, the thread 22 and shank 23 portions of the lead screw 17 are preferably joined by a smoothly curved transition section 33.

The basic capacitor 10 structure of the invention is susceptible of numerous modifications and variations to suit the needs of a particular application, as will be appreciated by the artisan from the foregoing description. For example, the outer end of the tubular member 11 can be sealed with a cap 34 made of plastic so as to prevent dirt, or dust from entering into the capacitor 10. If this is done, the closed end 18 of the piston 12 can be perforated where there is a close fit between the outside diameter of said piston 12 and the inside diameter of the tube 13, so that said piston 12 can be moved easily without any significant air compression resistance. It should be noted that the piston 12 diameter can be made approximately equal to the inside diameter of the tube 13 with an allowance for sliding clearance, in order to render the capacitor 10 less susceptible to vibration.

While the piston 12, lead screw 17 and bushing 15 are expediently constructed so that the piston 12 travels coaxially with respect to the tubular member 11, this is not absolutely necessary as the capacitor 10 can function as a trimmer capacitor with little change in linearity characteristics even if the piston 12 is arranged to travel along a longitudinal axis offset from that of the tube 13 but parallel thereto.

To assure positive retention of the resilient member 29 within the bore 20, the outer end 35 of the bushing 15 can be crimped over said member 29.

With a cylindrical layer 14 and a cylindrical piston 12, there will be no significant departure from linear capacitance variation on account of said piston 12 being rotated as it is displaced axially. By mounting the piston 12 to the lead screw 17 for combined rotation and axial displacement therewith, a fixed piston 12 to lead screw 17 connection can be used, thereby assuring a better electrical conduction between them as compared with a non-rotating piston arrangement which would necessitate a rotary type piston 12 to lead screw 17 connection, as well as means for restraining piston 12 rotation.

What is claimed is:

1. A piston trimmer capacitor which comprises a tubular member defining a fixed capacitor plate, a piston member defining a movable capacitor plate electrically insulated from the fixed capacitor plate defined by said tubular member, said piston member being disposed for combining axial and rotary movement within said tubular member to adjustably position said piston member relative to said tubular member for varying the capacitance established by the capacitor plates defined by each, a support bushing inserted into one end of said tubular member, said support bushing having a longitudinally disposed bore and a longitudinally extending electrically conductive collet bushing portion, and a lead screw member electrically operatively connected to said piston member and disposed in threaded engagement with the bore of said support bushing and combined rotation and axial movement relative thereto to position said piston member with respect to the tubular member for adjusting the capacitance established thereby, said lead screw member having a substantially smooth electrically conductive portion conductively connected to said piston member and disposed for wiping contact engagement with said electrically conductive collet bushing portion to establish an electrical conduction path to the movable capacitor plate defined by said piston member; wherein the inside circumference of said collet bushing portion contacts, at most, said smooth electrically conductive portion and said threaded bushing bore contacts only the threaded portion of said lead screw; wherein said smooth conductive portion has a length substantially equal to the maximum available axial travel distance of said piston member; and wherein electrical contact is made between both said collet bushing and said piston and said threaded bushing bore and said piston.

2. The piston trimmer capacitor according to claim 1 wherein said tubular member includes a tube of electrical insulating material constituting the principal dielectric of the capacitor, and a metallic layer disposed in contact with the exterior surface of said insulating tube for support thereby, said metallic layer constituting the fixed plate of said capacitor.

3. The piston trimmer capacitor according to claim 2 wherein the electrically conductive portion of the lead screw in wiping contact engagement with the collet bushing portion is a substantially smooth cylindrical surface.

4. The piston trimmer capacitor according to claim 2 wherein said collet bushing portion extends into said tubular member, wherein said smooth electrically conductive portion of the lead screw member has an enlarged diameter as compared with the threaded portion thereof, and wherein the support bushing has an internal shoulder disposed in circumferentially surrounding relation to the lead screw member to permit free passage therethrough of the threaded portion thereof and to engage said enlarged diameter shank portion thereof to limit the axial travel of said lead screw member and piston member.

5. The piston trimmer capacitor according to claim 2 wherein said piston member is a hollow cylindrical metallic piston closed at one end and connected to one end of the lead screw member at said closed end portion.

6. The piston trimmer capacitor according to claim 2 wherein said support bushing has an externally threaded shank portion extending longitudinally outward with respect to the tubular member to accommodate the mounting of the capacitor to a support means.

7. The piston trimmer capacitor according to claim 2 including a tubular member of resilient material inserted into the bore of the support bushing and disposed in frictional contact engagement with the thread of said lead screw member to aid in maintaining axial position settings of the piston member effected thereby.

8. The piston trimmer capacitor according to claim 4 wherein said collet bushing portion has a contact surface of lesser free diameter than that of the enlarged diameter cylindrical shank portion of the lead screw to exert a frictional force thereupon when said shank portion and the contact surface of the collet bushing portion are in wiping contact engagement, thereby aiding in the retention of axial position settings of the piston member effected by rotation of the lead screw member.

9. The piston trimmer capacitor according to claim 4 wherein said piston member has a diameter approximately equal to the inside diameter of the insulating tube.

10. The piston trimmer capacitor according to claim 1 wherein said piston has in inside diameter larger than the outside diameter of the smooth portion of said lead screw and the outside circumference of said collet bushing contacts the inside circumference of said piston.

References Cited

UNITED STATES PATENTS

| 2,669,700 | 2/1954 | Rauch | 336—136 X |
| 2,754,458 | 7/1956 | Shull | 317—249 |
| 3,071,716 | 1/1963 | Young | 317—249 |

FOREIGN PATENTS

| 768,410 | 2/1957 | Great Britain. |

LEWIS H. MYERS, *Primary Examiner.*
E. A. GOLDBERG, *Assistant Examiner.*